July 10, 1962     L. A. RICHARDS     3,043,133
GAGE ATTACHMENT AND AIR REMOVAL ARRANGEMENT
FOR SOIL-MOISTURE TENSIOMETERS
Filed March 23, 1959

INVENTOR.
LORENZO A. RICHARDS
BY
AGENT

United States Patent Office 3,043,133
Patented July 10, 1962

3,043,133
GAGE ATTACHMENT AND AIR REMOVAL ARRANGEMENT FOR SOIL-MOISTURE TENSIOMETERS
Lorenzo A. Richards, 4455 Fifth St., Riverside, Calif.
Filed Mar. 23, 1959, Ser. No. 801,187
3 Claims. (Cl. 73—73)

My invention relates to improved gage-type soil-moisture tensiometers and to the combination of such tensiometers and an auxiliary unit cooperating with said tensiometers to provide means for readily servicing such tensiometers to easily maintain them in good operating condition.

Essentially a soil moisture tensiometer consists of a water-filled system provided with a vacuum gage, the system which is generally tubular, comprising a soil tube with which the gage communicates and a porous ceramic cup or tube section attached to said soil tube at the lower end thereof. Generally the uppermost part of the system is transparent and openable so that air in the system can be detected and removed by the process of filling the system with water. Such tensiometers are used in agriculture for measuring the condition of water in soil. By means of such tensiometers, it is possible to determine the need for irrigation.

In the past, the use of tensiometers by farmers, gardeners and the like, has been limited by the cost of the units and the expense and trouble of maintaining the units in operable condition. Tensiometers which include mercury manometers for determining vacuum in the tensiometer have been cumbersome and such units are highly susceptible to breakage. Tensiometers using gages require gage replacement, calibration, etc. All types of tensiometers have been susceptible to frost damage. Moreover, these units require servicing whenever an appreciable amount of air accumulates in the tensiometer. Air accumulation is more or less inevitable since air comes from the water, from leaks in the porous cup, from joints in the system, or from diffusion through other parts of the tensiometer as, for example, rubber stoppers, gaskets and even through the walls of the vacuum system. Materials of construction, even though normally considered to be non-permeable to air, are permeable to a slight degree and thus air does tend to accumulate within a tensiometer. Consequently, the design of the instrument should minimize the number of joints in the system and must incorporate means for detecting and removing air. The various features of the tensiometer and auxiliary servicing unit of my invention comprise a substantial improvement in gage-type tensiometers.

Objects of my invention are:

First, to provide a gage-type tensiometer which is simplified in that the gage is attached to and communicates with the soil tube through a single opening at the top of the soil tube.

Second, to provide a tensiometer in which the gage and mounting assembly are readily removable and separable from the soil tube for calibration or for replacement in the event this becomes necessary.

Third, to provide a tensiometer having means for maintaining the gage completely liquid filled at all times, and particularly during the process of removing air from the tensiometer.

Fourth, to provide a tensiometer having all of the above features and having means for permitting the use of an anti-freeze liquid in the gage to prevent freezing.

Fifth, to provide a tensiometer having a built-in reservoir of refill water arranged in such a manner as to minimize air leaks into the tensiometer.

Sixth, to provide a servicing unit which cooperates with the tensiometer to permit the testing of tensiometer gages for accuracy of readings and for filling said gages with liquid, the testing of tensiometer units for air leakage, and to provide a convenient means for supplying air-free water for filling tensiometers in the field.

With the above and other objects in view as may appear hereinafter, reference is directed to the accompanying drawings, in which FIGURE 1 is a partial sectional view of a soil-moisture tensiometer embodying certain features of my invention.

Figure 1:
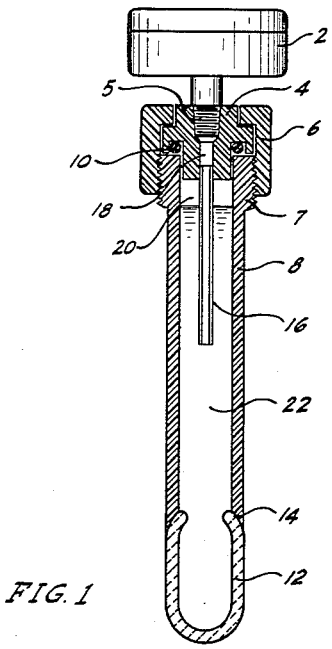
Figure 4:
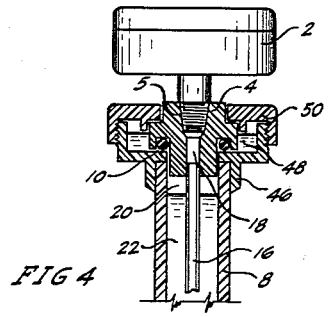

FIGURE 4 is a partial sectional view of a modified tensiometer having an annular reservoir means surrounding the gage attachment plug for supplying water to said tensiometer. Only the upper part of the soil tube is shown in this figure, but the remaining portion of the soil tube carrying a ceramic cup is as shown in FIGURE 1. Moreover, the gage tube is merely indicated in FIGURE 4 but this tube may take the form shown in FIGURES 1 or 2.

In describing and explaining the drawings, the same numbers are used to indicate the same parts or structures in the various figures.

Attention is directed now to FIGURE 1. A conventional Bourdon-tube vacuum gage 2 is screwed into plug 4 at threaded opening 5 and sealed at this connection by using a sealing or cementing compound. Plug 4, which may be made of a relatively hard plastic as, for example, nylon, Teflon, Lucite or the like, is held in place at the top of soil tube 8 by means of a union nut 6, which may also be made of the same or different plastic, which engages male threaded portion 7 at the top of said soil tube, and a seal is made between the plug and the top of the soil tube by means of O-ring 10. The soil tube 8 is a transparent plastic tube which is further connected to porous ceramic cup 12 by means of cemented joint 14. Cements such as those prepared from the plastic employed using suitable solvents therefor are useful for making this connection. Porous ceramic cups suitable for this purpose are well known and need not be further described here. Suitable porous cups, useful herein, are available commercially under the name of "Soil Moisture Tensiometer Cups" from Lark Instruments, Riverside, California. Gage extension tube 16 (or simply gage tube) is cemented into the lower end of channel 18 in plug 4. The tube extends downwardly within the soil tube 8 so that the lower end of tube 16 remains below the water level in said soil tube. Channel 18 communicates with gage 2 and through tube 16 with the liquid in soil tube 8. Accumulated air 20 is shown at the highest point in tube 8, the remainder of the system being filled with liquid water 22. To remove accumulated air, nut 6 is unscrewed, the gage assembly consisting of gage 2, plug 4, nut 6 and gage tube 16 is raised with respect to the soil tube, the soil tube is then completely refilled with water, and the gage assembly lowered into place and again sealed by screwing nut 6 into place. Because of the use of an O-ring, it is merely necessary to make this connection hand-tight to obtain a satisfactory seal.

Soil tube 8 is preferably a Lucite or other hard, transparent plastic tube of generally between about 0.25 to 0.50 inch I.D. and 0.40 to about 0.75 or 1 inch O.D. Its length depends upon the depth at which soil moisture measurements are to be made. For general use by farmers, etc., in determining need for irrigation, a soil tube 1 to 3 or 6 feet in length suffices. However, if measurements of moisture condition in subsurface structures, e.g., fills, earth dams and the like, are to be made, the soil tube can be inclined at an angle and made longer so that the upper end extends above the soil surface. The porous ceramic cup is the sensing unit and its location in the soil determines the point at which moisture conditions are measured.

Gage tube 16 must be of sufficient length so that its lower end remains below any air accumulated in the top of the soil tube. Thus, the end of tube 16 must extend into the water present in the tensiometer in order to serve its function of preventing air from entering the gage as vacuum changes occur within the tensiometer, or as the seal formed between the gage assembly and the soil tube is broken when the assembly is removed for the purpose of removing air from the system. In most instances the tube should extend at least 1 inch, and preferably at least about 2 inches, below the bottom of plug 4 (FIG. 1). In the usual arrangement it will extend into the soil tube between about 2 and about 4 inches beyond plug 4, although longer tubes can obviously be used to advantage where long soil tubes are employed. The gage tube is preferably made of a rigid or semi-rigid plastic. Cellulose acetate tubing is satisfactory. It should be transparent or at least translucent so that air bubbles may be seen if they are present in the tube. The inside diameter of this tube should be between about 0.5 and about 2 or 3 mm. In tubes of this size, the capillary effect is such that water will not be displaced by air with ordinary handling so that a gage assembly when removed for servicing will remain filled with water.

Figure 2:
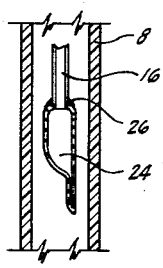
FIGURE 2 is a sectional view of a portion of my soil-moisture tensiometer showing means for protecting the gage against frost. Features not shown are identical with those shown in FIGURE 1, or in another variation, those shown in FIGURE 4.

FIGURE 2 shows a modified form of the tensiometer described in FIGURE 1. This figure, which is a sectional view of a portion of the tensiometer of FIGURE 1, shows a portion of soil tube 8 and gage tube 16 in their relationship shown in FIGURE 1. At the bottom of gage tube 16 there is attached a rubber or pliable plastic bag 24. This attachment may be made by means of cement at point 26. The bag is shown in a partly collapsed state as more fully described below. This modification provides a means for filling the system, including the gage, channel 18 as shown in FIGURE 1, tube 16 and bag 24 with an anti-freeze liquid such as ethylene glycol, or the like. In selecting an anti-freeze liquid, it is essential that the one selected will not have a higher vapor pressure than water, will not corrode the internal surfaces of the vacuum gage, and will not dissolve or soften the plastic of which the plug and gage tube are made. Moreover, it must not dissolve the bag attached to the gage tube. Aqueous solutions of low molecular weight water-miscible glycols such as ethylene glycol, propylene glycol and the like, or glycerol, are entirely satisfactory. Generally 5 to 50 percent solutions of such polyalcohols in water will be employed. This constitutes a separate closed system within the tensiometer completely enclosed system or soil tube system and prevents the anti-freeze liquid within the first mentioned system from coming in contact or mixing with water in the second mentioned system. Pressure changes occurring within the tensiometer system are thus transmitted to the first mentioned or gage closed system and gage pressures accurately reflect the pressures in the second mentioned closed system or soil tube system. Although the gage system is indicated to be filled with anti-freeze liquid, it is to be understood that this simply means that no air is to be present after filling the system. At ordinary pressures the bag should be at least partly collapsed so that upon applying a vacuum, liquid flowing from the gage will flow into the bag without producing a pressure difference in the two closed systems.

Figure 3:
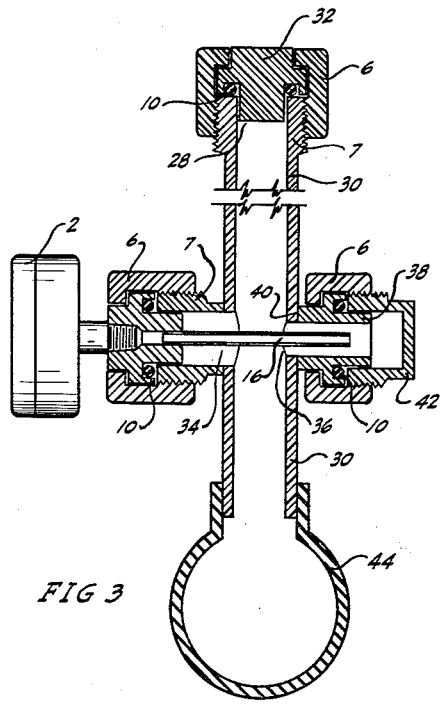
FIGURE 3 is a sectional view of a device for servicing the tensiometer.

FIGURE 3 is a partial sectional view of a tensiometer servicing unit which is preferably made of transparent plastic. Opening 28 in body 30 is closed by means of plug 32 held in place by nut 6 and sealed with O-ring 10. This plug is replaceable with a gage assembly as shown in FIGURE 1 and described above when it is desired to calibrate the gage.

At opening 34 a short section of plastic tube with a threaded section 7 is cemented to the main body 30 as shown. This opening is closed by means of a gage assembly represented by gage 2, plug 4, nut 6 and gage tube 16. This can be a standard or calibrated gage and thus used to calibrate a second gage assembly placed in opening 28, or it may be merely a replacement gage suitable for substituting for a damaged gage in the field. If such substitution is made, the complete gage assembly is removed from opening 34 as a unit and the servicing unit is again made operable by closing opening 34 with a plug, seal and nut similar to the one shown at opening 28.

At opening 36 a right angle extension 38 is cemented to body 30 at point 40. This extension is similar in external configuration to plug 4. However, this extension has a larger channel 40 extending lengthwise through it so that it will accommodate tube 16 when a gage assembly is used to close opening 34. Nut 6, permanently in place on extension 38, engages male threads on the outside of cap 42 and a seal is formed by O-ring 10. Cap 42 is merely a short closed section of a tube of the same external dimensions as soil tube 8, and the threaded section corresponds to the threaded section 7 of a tensiometer soil tube, the latter two numbered features being shown in FIGURE 1. The servicing unit is, therefore, readily sealed to the top of a tensiometer for testing for air leaks in the tensiometer by removing the gage assembly from the tensiometer of FIGURE 1 and the cap 42 from the servicing unit, and connecting the servicing unit to the top of the tensiometer.

The lower end of service unit body 30 carries a heavy-walled rubber or rubber-like bulb 44 having adequate resiliency to provide a vacuum sufficient to boil water at ambient temperatures by collapsing the bulb with the system completely filled with water, closing openings 28, 34 and 36, and then releasing the pressure on bulb 44. In this way, i.e., by producing a vacuum in the servicing unit, it is possible to maintain a supply of air-free water in the servicing unit for use in replacing accumulated air in tensiometers. Moreover, with a standardized gage at opening 34, a second gage, as for example one from a tensiometer in use in a field, can be readily calibrated, checked for leaks, damage and the like. Furthermore, with a standardized gage in place as above, and a plug or gage assembly closing opening 28, the unit can be used to determine air leaks in a field tensiometer by attaching the servicing unit at opening 36 to the top of a soil tube. Although leaks in vacuum systems are often extremely difficult to find even in completely equipped physics research laboratories, the servicing unit used in the manner just described makes possible the finding and repairing of leaks in the gage assembly and/or in the soil tube or ceramic cup, in the field.

In addition to the above, the servicing unit provides a convenient means for completely filling the gage and/or gage assembly with liquid. This is accomplished with the gage upside-down while the pressure in the servicing unit is fluctuated from high vacuum to zero vacuum. When a bag is used to close the end of gage tube 16, the gage assembly without the bag is first filled and the bag, partially filled with liquid, is then partially collapsed to remove air and sealed to the gage tube.

FIGURE 4 is a partial cross-sectional view of the upper portion of a tensiometer which in other respects is as shown in FIGURES 1 and 2. A Bourdon-type gage 2 is screwed and sealed into plug 4 at threaded opening 5 and communicates through channel 18 and gage tube 16 with the tubular system enclosed by soil tube 8 and ceramic cup, not shown in FIGURE 4 but as represented at 12 in FIGURE 1. Soil tube 8 is sealed by means of cement to reservoir body 46 which is shown to contain water 48. Plug 4 is sealed by means of O-ring 10 against reservoir body 46 and held in place, and the reservoir enclosed, by means of screw cap 50. In order to remove air 20 from the tensiometer, screw cap 50 is loosened sufficiently to permit water 48 to flow from the reservoir into soil tube 8, and air to pass in the reverse direction from the top of the soil tube into the reservoir area. With the above modification, removal of air from the top of the soil tube is most readily accomplished.

As illustrated and described hereinabove, the tensiometers of my invention are provided with a single opening at the top of the soil tube. The gage assembly therefor serves as a filler plug. Structures of the prior art have involved the use of at least two openings, i.e., an opening at the top of the soil tube used for filling the tensiometer system with water and subsequently replacing accumulated air with water, and a secondary opening at a lower point on the soil tube where a gage or manometer has been attached. The provision of two openings increases the chance for leaks in the unit and increases the required length of the soil tube.

Gage tube 16 is a particularly important feature of my invention because it accomplishes several useful objectives and really makes possible the use of the gage assembly as the filler plug. If a tensiometer without tube 16 were opened for air removal, air would move into the gage as the vacuum is released because all Bourdon-type gages require an internal volume change to produce a change of gage reading. But with tube 16 extending below the air bubble as shown in FIGURES 1 and 4, the gage sucks in water when the tensiometer is opened and a complete air removal job consists simply in filling the soil tube with water and re-installing the gage assembly. It is clear that for best operation on tensiometers, the gage must be liquid-filled. The expansibility of air contained in the gage has the same effect as if the air were in a bubble in the soil tube.

Although I have shown certain embodiments of my invention, I do not wish to be limited thereto, but desire to include in the scope of my invention all the novelty in the appended claims.

I claim:

1. The combination of (1), a soil-moisture tensiometer comprising a transparent soil tube, a porous ceramic cup sealed to said soil tube at one end thereof and a vacuum gage removably attached at the opposite end thereof, said gage communicating with the interior of said soil tube through a gage tube extending into said soil tube; and (2), a servicing unit therefor comprising a body portion having bulb means for producing a vacuum in said unit and three openings into said body portion, one of which is fitted with means for attaching and sealing said unit to the soil tube of said tensiometer and two of said openings are fitted with means for receiving and sealing gage assemblies thereinto, said gage assemblies comprising a Bourdon-type vacuum gage, a plug and a gage tube, said gage being sealed into one end of a channel extending lengthwise through said plug and said gage tube being sealed into the opposite end of said channel, the exposed end of said gage tube extending at least one inch beyond said plug.

2. The combination of (1), a soil-moisture tensiometer comprising a transparent soil tube having a single opening at each end thereof, a porous ceramic cup sealed to and closing said soil tube at one end thereof and a vacuum gage assembly removably attached and sealed to and completely closing said single opening at the opposite end thereof, said gage assembly comprising a Bourdon-type vacuum gage, a plug and a gage tube, said gage being sealed into one end of a channel extending lengthwise through said plug and said gage tube being sealed into the opposite end of said channel, the exposed end of said gage tube extending into and terminating intermediate the ends of said soil tube at least one inch beyond said plug; and (2), a servicing unit therefor comprising a transparent tubular body portion having bulb means for creating a vacuum in said unit and three openings into said body portion, one of which is fitted with means for attaching and sealing said unit to the soil tube of said tensiometer in place of said gage assembly normally attached and sealed thereto and two of said openings are fitted with means for receiving and sealing gage assemblies thereinto.

3. The combination of (1), a soil-moisture tensiometer comprising a transparent soil tube having a single opening at each end thereof, a porous ceramic cup sealed to and closing said soil tube at one end thereof and a vacuum gage assembly removably attached and sealed to and completely closing said single opening at the opposite end thereof, said gage assembly comprising a Bourdon-type vacuum gage, a plug and a gage tube, said gage being sealed into one end of a channel extending lengthwise through said plug and said gage tube being sealed into the opposite end of said channel, the exposed end of said gage tube extending into and terminating intermediate the ends of said soil tube at least one inch beyond said plug; and (2), a servicing unit therefor comprising a transparent tubular body portion having attached rubber-like bulb means for creating a vacuum in said unit, three openings into said body portion each having closure means, one of said openings being fitted with means for attaching and sealing said unit to the soil tube of said soil-moisture tensiometer and two of said openings being fitted with means for receiving and sealing gage assemblies thereinto.

References Cited in the file of this patent

UNITED STATES PATENTS

| 2,762,393 | Reese | Sept. 11, 1956 |
| 2,878,671 | Prosser et al. | Mar. 24, 1959 |

FOREIGN PATENTS

| 444,330 | Great Britain | Mar. 19, 1936 |